United States Patent [19]

Sherry et al.

[11] Patent Number: 5,280,288
[45] Date of Patent: Jan. 18, 1994

[54] INTERFERENCE AVOIDANCE SYSTEM FOR VEHICULAR RADAR SYSTEM

[75] Inventors: Russell F. Sherry, San Diego; Jerry D. Woll, Poway; Van R. Malan, La Jolla, all of Calif.

[73] Assignee: Vorad Safety Systems, Inc., San Diego, Calif.

[21] Appl. No.: 930,760

[22] Filed: Aug. 14, 1992

[51] Int. Cl.$^5$ .................. G01S 7/292; G01S 7/285
[52] U.S. Cl. .................. 342/83; 342/159; 342/196
[58] Field of Search .......... 342/82, 83, 84, 85, 342/70, 71, 72, 159, 195, 196

[56] References Cited

U.S. PATENT DOCUMENTS

| | | | |
|---|---|---|---|
| 3,643,257 | 2/1972 | Thomson et al. | 342/92 |
| 3,753,398 | 5/1973 | Ross | 342/21 |
| 3,909,725 | 9/1975 | Baghdady | 325/347 |
| 3,911,366 | 10/1975 | Baghdady | 325/347 |
| 4,051,438 | 9/1977 | Pickett et al. | 325/45 |
| 4,088,955 | 5/1978 | Baghdady | 325/56 |
| 4,291,309 | 9/1981 | Spiller et al. | 342/82 |
| 4,328,591 | 5/1982 | Baghdady | 455/303 |
| 4,348,675 | 9/1982 | Senzaki et al. | 342/71 |
| 4,354,191 | 10/1982 | Matsumura et al. | 342/83 |
| 4,513,249 | 4/1985 | Baghdady | 328/150 |
| 4,740,045 | 4/1988 | Goodson et al. | 342/112 |
| 4,901,083 | 2/1990 | May et al. | 342/128 |
| 4,916,450 | 4/1990 | Davis | 342/71 |
| 5,087,918 | 2/1992 | May et al. | 342/85 |
| 5,134,411 | 7/1992 | Adler | 342/130 |
| 5,181,038 | 1/1993 | Asbury et al. | 342/70 |

Primary Examiner—John B. Sotomayor
Attorney, Agent, or Firm—Spensley Horn Jubas & Lubitz

[57] ABSTRACT

An interference avoidance system used in conjunction with a vehicular target detection system. The microwave transceiver section of the vehicular target detection system, in which the present invention is incorporated, transmits and receives time-multiplexed microwave signals having at least two channels (frequencies) spaced about 250 kHz apart. The time-multiplexed transmit signal is transmitted and strikes objects (targets) in the environment, and a portion of the transmit signal is reflected back the antenna. A difference signal having a frequency equal to the difference between the frequency of the transmit and the received signal is generated, digitized, and a Fast Fourier Transform (FFT) is performed on the digitized difference signal. A microcontroller analyzes the energy spectrum to determine whether there is interference present. If such interference is present, the microcontroller causes the transmit frequency to change until a frequency is found which is relatively free of the interference.

18 Claims, 7 Drawing Sheets

| FREQ GHz | FC0 | FC1 | CONTROL LINE ||||
|---|---|---|---|---|---|---|
| | | | FREQ A | FREQ B | FREQ C | FREQ D |
| 24.110 | 1 | 1 | 0 | 0 | 0 | 0 |
| 24.110250 | 1 | 1 | 0 | 0 | 0 | 1 |
| 24.115 | 0 | 1 | 0 | 0 | 0 | 0 |
| 24.115250 | 0 | 1 | 0 | 0 | 1 | 0 |
| 24.120 | 1 | 0 | 0 | 1 | 0 | 0 |
| 24.120250 | 1 | 0 | 1 | 0 | 0 | 0 |
| 24.125 | 0 | 0 | 0 | 0 | 0 | 0 |
| 24.125250 | 0 | 0 | 0 | 0 | 0 | 0 |

FIG. 4

INTERFERENCE AVOIDANCE SYSTEM FOR VEHICULAR RADAR SYSTEM

BACKGROUND OF THE INVENTION

1. Field of the Invention

This invention relates to vehicular target detection systems, and more particularly, to a method and apparatus for interference avoidance by changing the transmit frequency of a vehicular target detection system when interference is encountered.

2. Description of Related Art

There is a continuing need to increase the density of vehicles traveling the world's roadways, and simultaneously to improve the safety of highway vehicle operations by preventing highway vehicles from colliding with moving and stationary objects (such as roadside obstacles and other vehicles). One means for accomplishing these seemingly contradictory goals is to monitor environmental conditions, such as the relative speed, direction of travel, and distance between vehicles sharing the roadway, and to use such information to provide direct indications to the vehicle's operator of potential danger. It is becoming increasingly more common for vehicular engineers to consider the use of target detection systems, such as microwave radar systems, as the means to monitor such environmental conditions.

A number of vehicular target detection systems are currently known in the art. One such system is described in copending U.S. patent application, Ser. No. 07/695,951, entitled "Multi-Frequency Vehicular Radar System", and assigned to the assignee of the present invention. The radar system described therein transmit three time-multiplexed signals, two of which are used to determine the range of an object (target), and the third of which is used to determine the relative speed of the target. The upper and lower frequencies are separated from the center frequency by about 250 kHz with the center frequency being about 24.125 GHz. The system transmits the signals, and receives reflections from targets. By processing the reflected signal, the system determines the range and relative speed of the targets.

In another vehicular target detection system described in copending U.S. patent application, Ser. No. 930,066 entitled "Multi-Frequency Multi-Target Vehicular Radar System Using Digital Signal Processing" filed Aug. 14, 1992, assigned to the assignee of the present invention, the microwave transceiver generates and transmits a signal in which only two frequencies are time division multiplexed. The two frequency radar system uses a digital signal processor within the digital electronics section to determine the range and relative motion of targets based upon the difference between the frequency of the transmitted signal and the frequency of reflections of the transmitted signal subsequently received by the transceiver. The digital signal processor performs a series of Fast Fourier Transforms (FFT) on a digitized representation of the output of a radio frequency (RF) mixer. The analog output of the mixer is a signal having a frequency equal to the difference between the frequency of the transmitted signal as applied to one input of the RF mixer, and the summation of reflections of the transmitted signal after reflecting off targets in the environment, as well as various other signals which have been received by the transceiver, as applied to a second input to the RF mixer. Analyzing the results of the FFT allows a microprocessor within the digital electronics section to determine the range and relative motion of a multiplicity of targets. The microcontroller generates visual and audible warnings to the vehicle operator.

However, a significant problem which plagues both of these target detection systems (and in fact all target detection systems which rely upon receiving a reflection of a transmitted signal from a target) is interference with the transmitted signal and the reflections thereof, which may make detection of such reflections difficult or impossible. For example, microwave interference caused by a variety of sources of microwave energy, such as other vehicular radar systems, burglar alarms, automatic door openers, and speed-measuring radar systems can render a microwave vehicular target detection system inoperative for periods of time which can range from fractions of a second to minutes. Such an occurrence reduces the effectiveness of the vehicular target system in detecting moving or stationary objects, such as other vehicles and roadside obstacles.

Therefore, it is desirable to provide a vehicular target detection system that can cope with the presence of interference in the environment in which the target detection system is operating. The present invention provides a solution to this problem.

SUMMARY OF THE INVENTION

The present invention is an interference avoidance system used in conjunction with a vehicular target detection system. The interference avoidance system includes a microcontroller which, in the preferred embodiment of the present invention, also controls operations within the target detection system.

A microwave transceiver section of the vehicular target detection system, in which the illustrated embodiment of the present invention is incorporated, transmits and receives microwave signals. The transmit signal is time-multiplexed, alternating between at least two carrier frequencies, preferably spaced about 250 kHz apart. An oscillator, such as a Gunn diode, in the microwave transceiver section generates the transmit signal. A modulation signal from an oscillator modulation circuit causes the Gunn diode to alternate between the time-multiplexed frequencies. The time-multiplexed transmit signal is transmitted by means of a radar antenna. The transmit signal strikes objects (targets) in the environment and a portion of the transmit signal is reflected back to the antenna.

The received signal is coupled to one input of a difference detector, such as a radio frequency (RF) mixer used in the illustrated embodiment. A portion of the transmit signal is coupled to a second input of the RF mixer. The mixer outputs a difference signal having a frequency equal to the difference between the frequency of the transmit and the received signal. The difference signal is coupled to the front end electronics section, which digitizes the difference signal. A digital signal processing section maps the signal from the time domain into the frequency domain by performing a mapping function, such a Fast Fourier Transforms (FFT), on the digitized difference signal.

Upon performing the FFT on the digitized difference signal, the energy at discrete frequencies within a selected frequency band is determined. A microcontroller receives the results of the FFT operation. The microcontroller analyzes the energy spectrum to determine whether there is microwave interference present.

If such microwave interference is present on one, or both, of the transit frequencies, the microcontroller causes the oscillator modulation circuit to change transmit frequencies. If interference is again encountered, the microcontroller again causes a change in frequency. This process is repeated until a pair of frequencies is found which is relatively free of the interference. In the preferred embodiment of the present invention, the microcontroller can choose between four pairs of frequencies spaced about 5 MHz apart. The microcontroller cycles through the four available pairs of frequencies searching for a pair of frequencies that is relatively clear of interference. In the preferred embodiment of the present invention, if each pair of frequencies has substantial interference, the pair of frequencies having the least interference is transmitted.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 4 is a table showing the logic states of each of the control lines to the oscillator modulation circuit of FIG. 3, and the resulting frequencies generated by the Gunn diode.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention. In particular, the following description is given in the context of a particular vehicular radar system, yet it should be understood that the present invention may be incorporated in any target detection system in which the received signal, or some derivative signal, is mapped from the time domain into the frequency domain for the purpose of determining characteristics of targets in the environment, such as the presence, relative speed, and/or nature of such targets.

OVERVIEW

Figure 1:
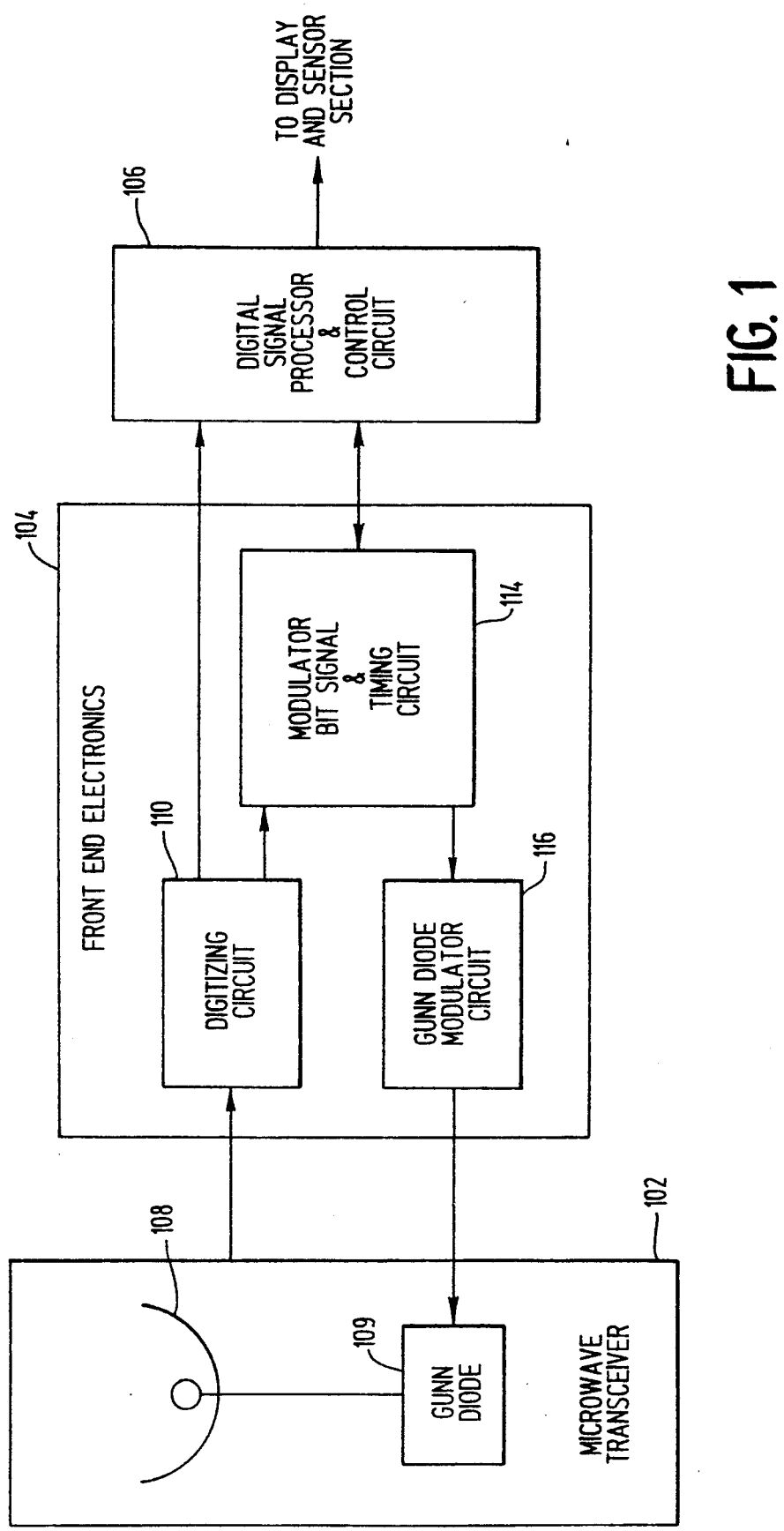
FIG. 1 is a simplified block diagram of a two frequency vehicular target detection system incorporating the present invention.

FIG. 1 is a block diagram of a prior art vehicular target detection system incorporating the present invention. The vehicular target detection system of FIG. 1 includes a microwave transceiver section 102, a front end electronics section 104, and a digital signal processing and control section (DSPCS) 106. A complete description of the vehicular target detection system shown in FIG. 1 is given in copending U.S. patent application, Ser. No. 930,066, entitled "Multi-Frequency, Multi-Target Automotive Radar System using Digital Signal Processing" filed Aug. 14, 1992, which has been assigned to the assignee of the present invention, and which is herein incorporated by reference.

The microwave transceiver section 102 includes a radar antenna 108 which transmits a radio frequency (RF) signal generated by an oscillator, such as a Gunn diode 109, and receives the reflection of that signal off objects (targets) in the environment of the vehicle upon which the radar system is mounted. The Gunn diode 109 is controlled by an oscillator modulation circuit 116 which in turn is controlled by a timing generator circuit 114. The output from the microwave transceiver section 102 is coupled to the front end electronics section 104.

The front end electronics section 104 includes a digitizing circuit 110 which receives the output from the microwave transceiver section 102. The signal is digitized and coupled to the DSPCS 106 which maps the digitized signal data from the time domain into the frequency domain, as described in the copending "Multi-Frequency, Multi-Target Automotive Radar System using Digital Signal Processing" patent application.

Once the signal is mapped into the frequency domain, microwave interference is identified in accordance with the present invention. If interference is present, a command from the DSPCS 106 is generated to instruct the front end electronics section 104 to change the transmit frequency.

DETAILS OF OPERATION

The details of the operation of the preferred microwave transceiver section 102 and digitizing circuit 110 are fully disclosed in the copending "Multi-Frequency, Multi-Target Automotive Radar System using Digital Signal Processing" patent application. However, it should be understood that the details of such sections of the radar system are not necessary for enabling a person skilled in the art to make and use the present invention, and do not hinder this description from setting forth the best mode contemplated by the inventors of carrying out the present invention.

Figure 2:
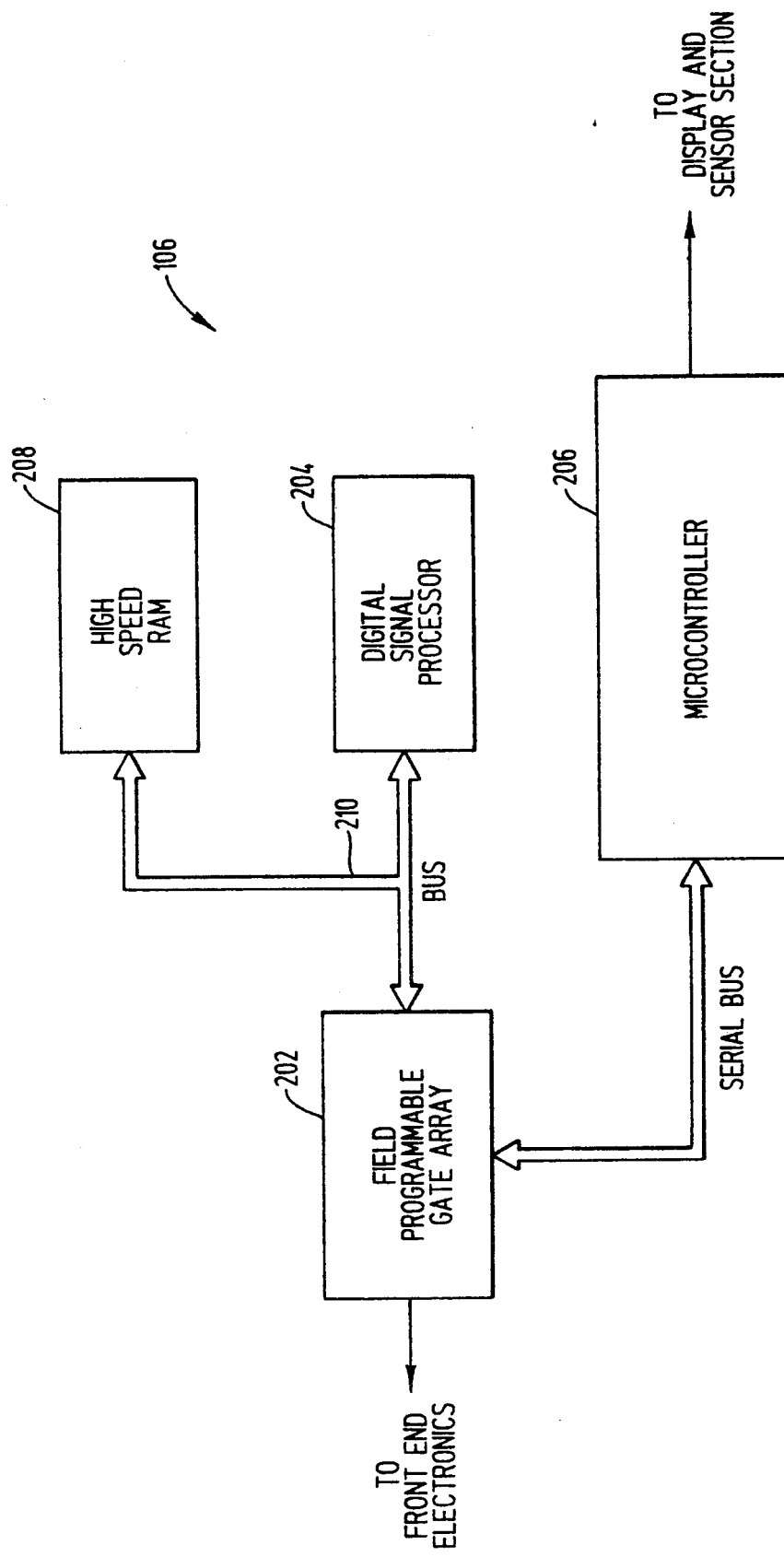
FIG. 2 is a block diagram of the digital signal processor and control circuit of a two frequency vehicular target detection system incorporating the present invention.

The DSPCS 106 is shown in greater detail in FIG. 2. The DSPCS 106 includes a field programmable gate array (FPGA) 202, digital signal processor (DSP) 204, a microcontroller 206, and a data storage device, such as a high speed RAM 208 used in the illustrated embodiment. The FPGA 202 receives the digitized signal data output by the digitizing section 110. The FPGA 202 loads the digitized signal data into the RAM 208 in known fashion and generates a direct memory access (DMA) request to the DSP 204 to pass control of the bus 210 to the FPGA 202 when each full word of data has been stored.

When sufficient data has been stored in the RAM 208, the DSP 204 calculates the FFT on the digitized signal data so stored. The DSP 204 is coupled to the microcontroller 206. In the two frequency radar system of the copending "Multi-Frequency, Multi-Target Automotive Radar System using Digital Signal Processing" patent application, the results of the FFT include the power level of the low frequency noise floor and the high frequency noise floor. The power level of the low frequency noise floor is the average power at each frequency below f/2, and the power level of the high frequency noise floor is the average power at each frequency above f/2, where f is the bandwidth of interest. The bandwidth of interest in the illustrated embodiment of the present invention are those frequencies that are approximately within the frequency range of 0 to 7.5 kHz. The results of the FFT are coupled from the DSP 204 to the microcontroller 206. The microcontroller 206 analyzes the results of the FFT and determines whether microwave interference is present.

In the preferred embodiment of the present invention, to determine if microwave interference is present the microcontroller 206 compares the amount of power in the noise floor with a predetermined threshold set in the microcontroller 206. In an alternative embodiment of the present invention, the microcontroller 206 dynamically determines the threshold. In one such alternative embodiment, the threshold is determined by averaging the power level in the noise floor across a band of frequencies sampled at specified intervals in frequency and time. The threshold is set at a predetermined fixed level above the average level of the noise floor over a specified period of time.

In another embodiment, the noise floor is determined by direct input from an operator based upon knowledge of the local environment. In yet another embodiment, an offset from a fixed threshold is used to determine the maximum power allowable in the noise floor. For example, if the threshold were set at a power level of "X" dBm, the microcontroller 206 would determine that interference exists whenever the noise floor had a power level "Y" dB above "X" dBm. The offset "Y" is programmable or is determined based upon the level of the noise floor. Either a look-up table or a formula is used to determine the offset in those embodiments in which the offset is determined based upon the level of the noise floor.

The FPGA 202 acts as an interface between the microcontroller 206 and the front end electronics section 104. Commands from the microcontroller 206 are sent to the FPGA 202 in a synchronous serial format containing a header and an end byte, in known fashion. The commands preferably contains 8 serial bits. In the preferred embodiment, two of the bits of the command are used to indicate which of 4 base frequencies the Gunn diode 109 is to transmit (frequency A, B, C, or D). The remaining bits of the command are not relevant to the present invention.

If the microcontroller 206 determines that there is sufficient microwave interference to warrant changing the transmit frequency, the microcontroller 206 sends a "change frequency" command to the FPGA 202. The FPGA 202 then sends the command in synchronous serial format to the front end electronics section 104 where it is received by the timing generator circuit 114. The timing generator circuit 114 decodes the command and sets or resets control lines coupled to the oscillator modulation circuit 116.

The preferred embodiment of the present invention is incorporated in a radar system in which the transmit frequency alternates between two channels to permit the radar system to determine the range and relative speed of targets which reflect the transmitted signal. Each channel is assigned a frequency which may be changed under the control of the oscillator modulation circuit 116. In the preferred embodiment of the present invention, the difference between the frequency assigned to channel 1 and the frequency assigned to channel two remains approximately constant (i.e., approximately 250 kHz apart). The output of the Gunn diode 109 is proportional to the voltage applied to a frequency control input 118 on the Gunn diode 109.

Therefore, by controlling the voltage level applied to the frequency control input 118, the oscillator modulation circuit 116 determines the transmit frequencies associated with each channel.

Figure 3:
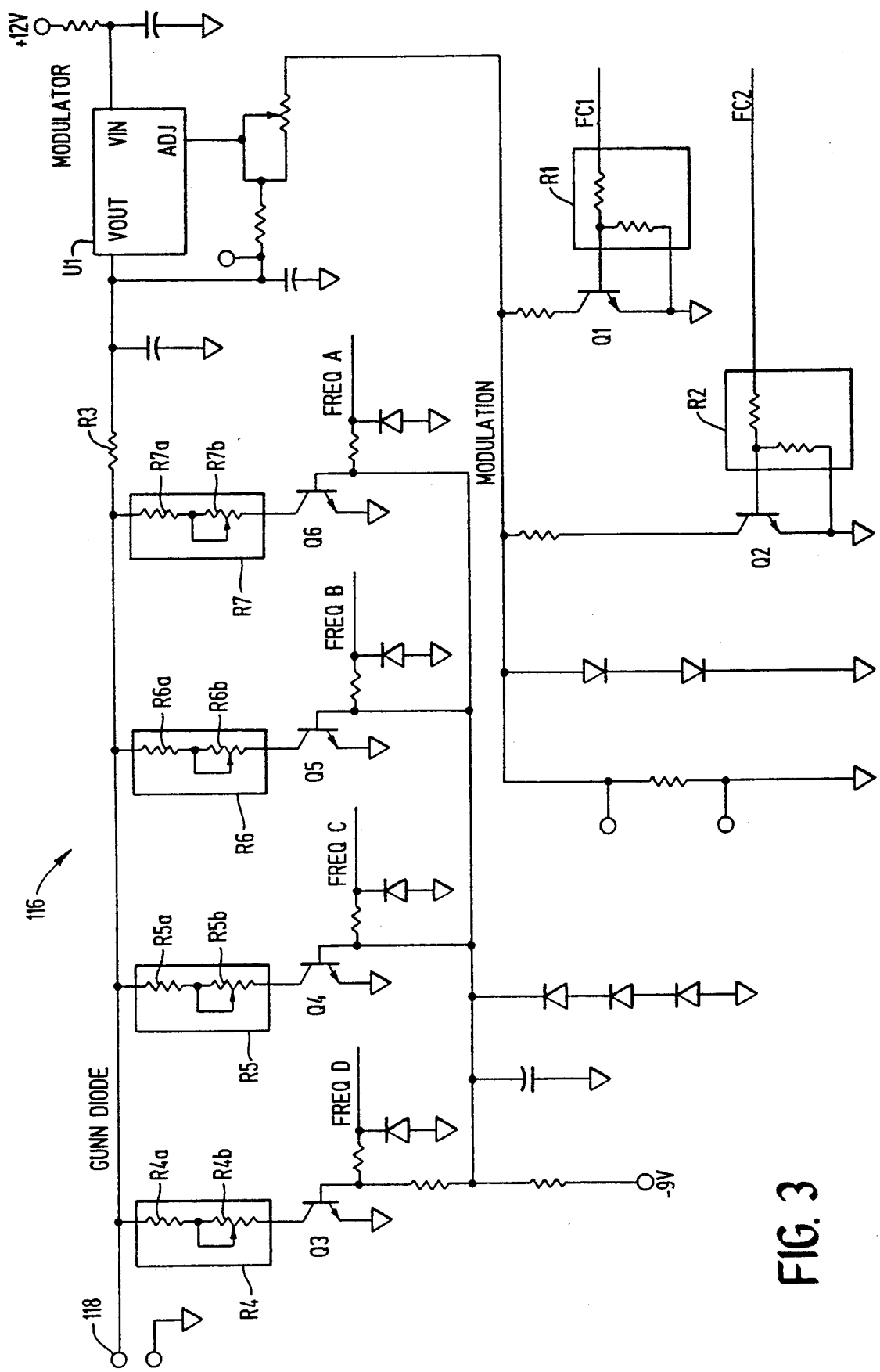
FIG. 3 is a detailed schematic of the oscillator modulation circuit of the present invention.

FIG. 3 is a detailed schematic of the oscillator modulation circuit 116. The oscillator modulation circuit 116 has 6 control lines FC1, FC2, FREQ A, FREQ B, FREQ C and FREQ D. Control lines FC1 and FC2 determine the base frequency which the Gunn diode 109 generates. Control lines FC1 and FC2 are only changed when a command is issued by the microcontroller 206.

Each of the control lines FC1 and FC2 are coupled to a resistor divider network R1, R2 which sets the voltage at the base of respective transistors Q1 and Q2. When the two control lines FC1, FC2 are set to a logical "1", the voltage at the base of each associated transistor Q1, Q2 rises, causing the transistor to conduct. When either transistor conducts, the resistance between a voltage regulator adjust input ADJ and ground is reduced. Reducing the resistance between the voltage regulator adjust input ADJ and ground reduces the level of the voltage at a voltage regulator output VOUT. In the preferred embodiment of the present invention, the voltage regulator U1 is a standard component, such as part No. LM317 manufactured by National Semiconductor.

The regulated output voltage at the VOUT port of the voltage regulator U1 changes when one or both transistors Q1, Q2 are conducting. Each of the four ($2^2$) possible combinations of states of the control lines FC1, FC2 cause a different voltage to be output by the voltage regulator U1. The table in FIG. 4 illustrates the relationship between the FC1, FC2 control line states and the transmit frequency in the preferred embodiment.

It should be understood by those skilled in the art that the frequency generated by a Gunn diode 109 is, in general, not linearly proportional to the control voltage applied to the Gunn diode 109. Therefore, the difference in control voltage required to produce a difference in frequency at any one particular frequency is different from the difference in control voltage required to produce an equal difference in frequency at a second frequency.

For example, in the preferred embodiment, if a control voltage of one volt is applied to the frequency control input 118 of a particular Gunn diode 109, the Gunn diode generates an output frequency of 24.125 GHz. By reducing the voltage by 0.8 volts, the frequency decreases to 24.124750 GHz. Therefore, a voltage difference of 0.8 volts alters the frequency by 250 kHz. When a voltage of 3 volts is applied to the frequency control input 118 of the same Gunn diode 109, the Gunn diode generates an output frequency of 24.110 GHz. In order to raise the frequency to 24.110250 GHz, the control voltage must be increased 3.4 volts (a difference of 0.4 volts).

It can be seen from this example that, in order to cause the Gunn diode 109 to alternate between two channels spaced approximately 250 kHz apart, the control voltage must alternate between two voltage levels which differ by an amount that is dependent upon the frequencies of the two channels. In the preferred embodiment of the present invention, each switching transistor Q3–Q6 and associated adjustable resistive network R4-R7 generates the two distinct voltages associated with a pair of transmit frequencies spaced about 250 kHz apart.

The remaining four control lines FREQ A, FREQ B, FREQ C, and FREQ D are "clock" lines which alternate between a logical "1" state and a logical "0" state at a frequency which is predetermined by timing considerations within the radar system. Only one of these four clock lines FREQ A, FREQ B, FREQ C, FREQ D is active at a time. The remaining three are held at a logic "0" state. When each of the clocks FREQ A, FREQ B, FREQ C, FREQ D are at a logical "0" state, the voltage applied to the frequency control input 118 is substantially equal to the voltage at the output VOUT of the voltage regulator U1. This is because the conductive paths through the Gunn diode 109 and the transistors Q3-Q6 have a high impedance, and thus conduct little current, resulting in a minimal voltage drop across the resistor R3.

When any one of the transistors Q3-Q6 conduct, current is drawn through the resistor R3 causing the voltage drop across the resistor R3 to increase. Thus, the voltage supplied to the frequency control input 118 is reduced from the level present when none of the transistors Q3-Q6 are conducting. A resistive network R4-R7 is associated with each transistor Q3-Q6. Each resistive network R4-R7 includes a fixed resistor R4a-R7a and a variable resistor R4b-R7b. Adjusting any variable resistor R4a-R7a changes the voltage at the frequency control input 118 when the transistor Q3-Q6 associated with the variable resistor R4a-R7a is conducting. Therefore, the ratio of the voltage at the frequency control input 118 when the transistor Q3-Q6 is conducting (i.e., when channel 1 is active) with respect to the voltage at the frequency control input 118 when the transistor Q3-Q6 not conducting (i.e., when channel 2 is active) can be adjusted. In this way, the difference between the frequency transmitted when each clock FREQ A, FREQ B, FREQ C, FREQ D is low and the frequency transmitted when the same clock is high can be adjusted. The frequencies that are transmitted in the preferred embodiment of the present invention are listed in table 1 of FIG. 4. It should be clear to those skilled in the art that the oscillator modulation circuit 116 may be implemented with a monolithic integrated digital to analog (D/A) converter circuit, such that digital inputs to the D/A converter circuit cause the output voltage of the oscillator modulation circuit 116 to change to a known value which results in a known frequency. Thus by controlling the digital inputs to such a monolithic integrated D/A converter circuit, the oscillator may be controlled to generate the desired frequencies.

Applying the above discussion to an example will further illuminate the inventive aspects of the present invention. In this example, assume that a radar system is initially operating under normal conditions at a transmit frequency that alternates between 24.125 GHz and 24.125250 GHz at regular intervals (i.e., the clock control line FREQ A is actively alternating between high and low logic levels).

The transmit signal is emitted into the environment by means of the antenna 108. Part of the signal is reflected back to the antenna 108 by targets which the transmit signal strikes. The received reflections of the transmit signal are contrasted with the transmit signal, demultiplexed, and digitized. The digitized samples are sent as a synchronous serial data stream of 24 bit words from the digitizing circuit 110 to the FPGA 202. The FPGA 202 writes each 24 bit word directly to the RAM 208. Each time a digitized sample of the signal is stored in the RAM 208, the DSP 204 is interrupted by the FPGA 202. During normal operations, the DSP 204 performs an FFT on the most recently stored 4,096 digitized samples of each channel. Thus far in this example, each of the above described functions is described in the copending "Multi-Frequency, Multi-Target Automotive Radar System using Digital Signal Processing" patent application.

Figure 5A:
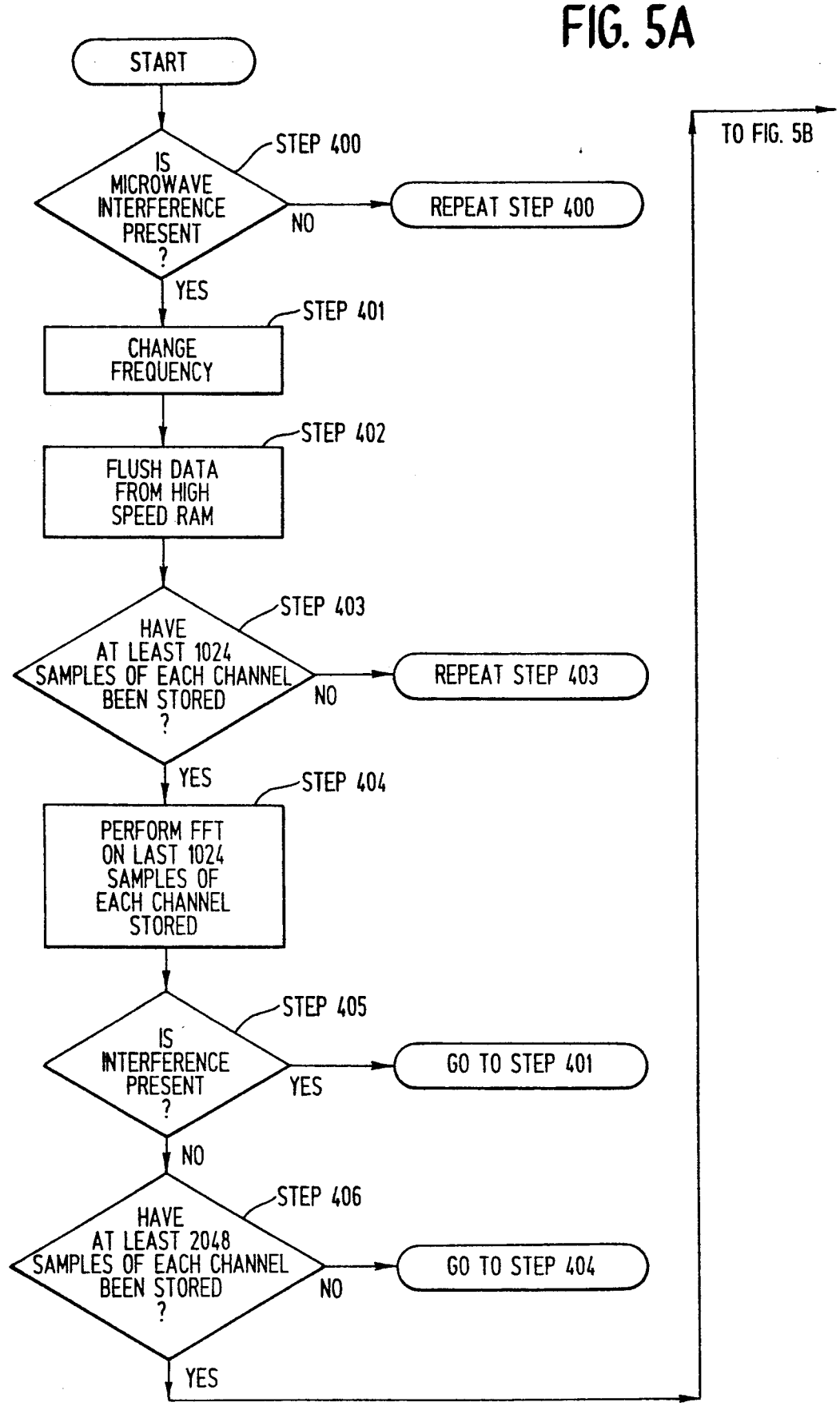
FIG. 5 is a logical flowchart showing the procedure followed by the present invention when interference is encountered.
Figure 5B:
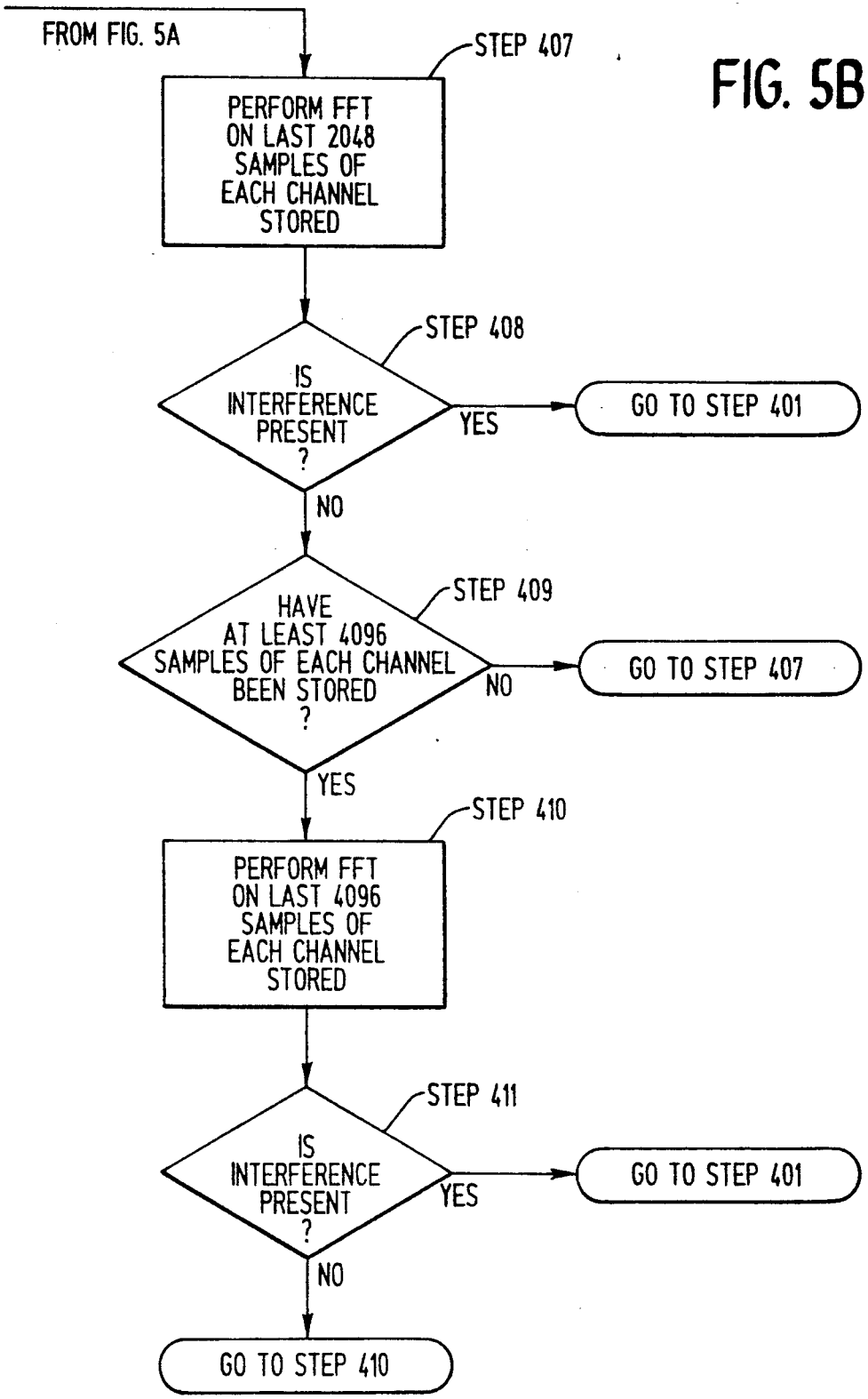

When the preferred embodiment of the present invention is incorporated in a target detection system, such as the two frequency radar system of the example above, the microcontroller 206 within the target detection system takes on additional duties. However, an alternative embodiment of the present invention has an independent microcontroller which performs all the necessary control functions without burdening the target detection system microcontroller 206. FIG. 5 is a flow chart of the operation of the present invention as incorporated within such a two frequency digital radar system. Each step of the flow chart can be performed in any order unless otherwise specified. The microcontroller 206 receives data from the DSP 204 which indicates the power level of the noise floor in the current environment. The microcontroller 206 determines whether there is microwave interference based on this information (STEP 400).

If the noise floor is below the threshold set within the microcontroller 206, the microcontroller 206 continues to monitor the output of the DSP 204 to ensure that the noise floor remains below the predetermined threshold. If, however, the noise floor rises above the predetermined threshold, the microcontroller 206 sends a "change to frequency n" command to the oscillator modulation circuit 116, as disclosed above, to change the transmit frequency (STEP 401). The microcontroller 206 also sends a command to the FPGA 202 to flush all the samples stored thus far, since such samples have been contaminated by the interference (STEP 402).

After flushing the samples from the RAM 208, new data must be collected. Once the digitized samples are flushed, the system is "blind" until new samples can be collected and an FFT performed. Therefore, in order to expedite the process of determining the status of the environment, the DSP 204 begins counting the number of new samples stored in the RAM 208. Each time the FPGA 202 receives a new digitized sample, it initiates a DMA request. A DMA request causes the DSP 204 to release the bus shared by DSP 204, the FPGA 202, and the RAM 208. Once the DSP 204 has released the bus, the FPGA 202 writes the digitized sample to the RAM 208. In the preferred embodiment, the samples are organized as blocks of samples within the RAM 208. A block comprises two memory areas, each having 512 samples. The DSP 204 is interrupted when an entire block of samples have been stored in the RAM 208. Therefore, by counting either the number of interrupts generated by the FPGA 202, or by counting the number of bus accesses made by the FPGA 202, the DSP 204 can determine the number of samples of digitized signal data stored in the RAM 208.

After flushing the old samples, the DSP 204 monitors the FPGA 202 to determine when there are 1,024 new digitized samples associated with each channel in the RAM 208 (i.e., when at least 2 interrupts have occurred) (STEP 403). When at least 1,024 new digitized samples associated with each channel have been stored in the RAM 208, the DSP 204 performs an FFT on the last 1,024 such samples. The microcontroller 206 receives the results of the FFT and determines whether there is any microwave interference (i.e., in the preferred embodiment of the present invention, whether the noise floor is above the predetermined threshold) (STEP 405). If there is microwave interference, the system repeats STEPS 401-405 until a pair of frequencies are transmitted that is relatively free of interference. In the preferred embodiment of the present invention, there are only four possible pairs of frequencies. The microcontroller 206 selects the first pair of frequencies that appear to be relatively free of interference. If all frequencies have a relatively large amount of interference, the microcontroller selects the frequency pair with the least interference.

It should be obvious to those skilled in the art that the number of frequencies to which the transmitter can switch is a function of the Gunn diode range and the number of control lines and associated circuits included in the oscillator modulation circuit 116. Therefore, by adding additional control lines and associated control circuits, additional transmit frequencies may be added. It should also be obvious to those skilled in the art that, for each added transistor circuit such as those transistor circuits associated with transistors Q1 and Q2, the number of frequencies increases by a power of 2. However, for each new frequency added, a circuit such as the circuit associated with each transistor Q3-Q6 also must be added to the oscillator modulation circuit 116.

If the FFT is performed on the last 1,024 digitized samples associated with each channel of the signal (STEP 404) and the microcontroller 206 determines that the power level of the noise floor is below the threshold (STEP 405), the DSP 204 monitors the FPGA 202 to determine when 2,048 digitized samples associated with each channel have been stored in the RAM 208. The DSP 204 continues to perform an FFT on the last 1,024 digitized samples associated with each channel (STEPS 404-406) until at least 2,048 digitized samples associated with each channel have been stored in the RAM 208 (STEP 406). When at least 2,048 digitized samples associated with each channel have been stored in the RAM 208, the DSP 204 performs an FFT on the last 2,048 digitized samples associated with each channel (STEP 407).

After performing an FFT on the last 2,048 digitized samples associated with each channel, the microcontroller 206 again determines whether the power in the noise floor is below the threshold, indicating that no microwave interference is present (STEP 408). If interference is detected, the system returns to STEP 401 and progresses through the subsequent steps again. If no interference is present, the DSP 204 determines whether 4,096 digitized samples associated with each channel have been stored (STEP 409) in the RAM 208. The DSP 204 continues to perform an FFT on the last 2,048 digitized samples associated with each channel that have been stored until the FPGA 202 has stored in the RAM 208 at least 4,096 digitized samples associated with each channel (i.e., until 8 interrupts have been made by the FPGA 202).

When at least 4,096 digitized samples associated with each channel have been stored the DSP 204 performs an FFT on the 4,096 samples with each channel which were last stored (STEP 410). Once again the microcontroller 206 determines whether there is interference present (STEP 411). If there is no interference present, the DSP 204 continues to perform an FFT on the last 4,096 samples associated with each channel as each new sample is stored in the RAM 208. If interference is encountered, the system repeats the process from STEP 401.

By flushing the data that was previously stored in the RAM 208, contamination that is introduced by the interference, and which could cause target errors, is erased. By re-calculating the FFT on an initial 1,024 samples of each channel, the amount of time required to regain the targets and continue tracking is reduced by 75% of the time that would be required if 4,096 samples associated with each channel were necessary before performing the next FFT.

Figure 6:
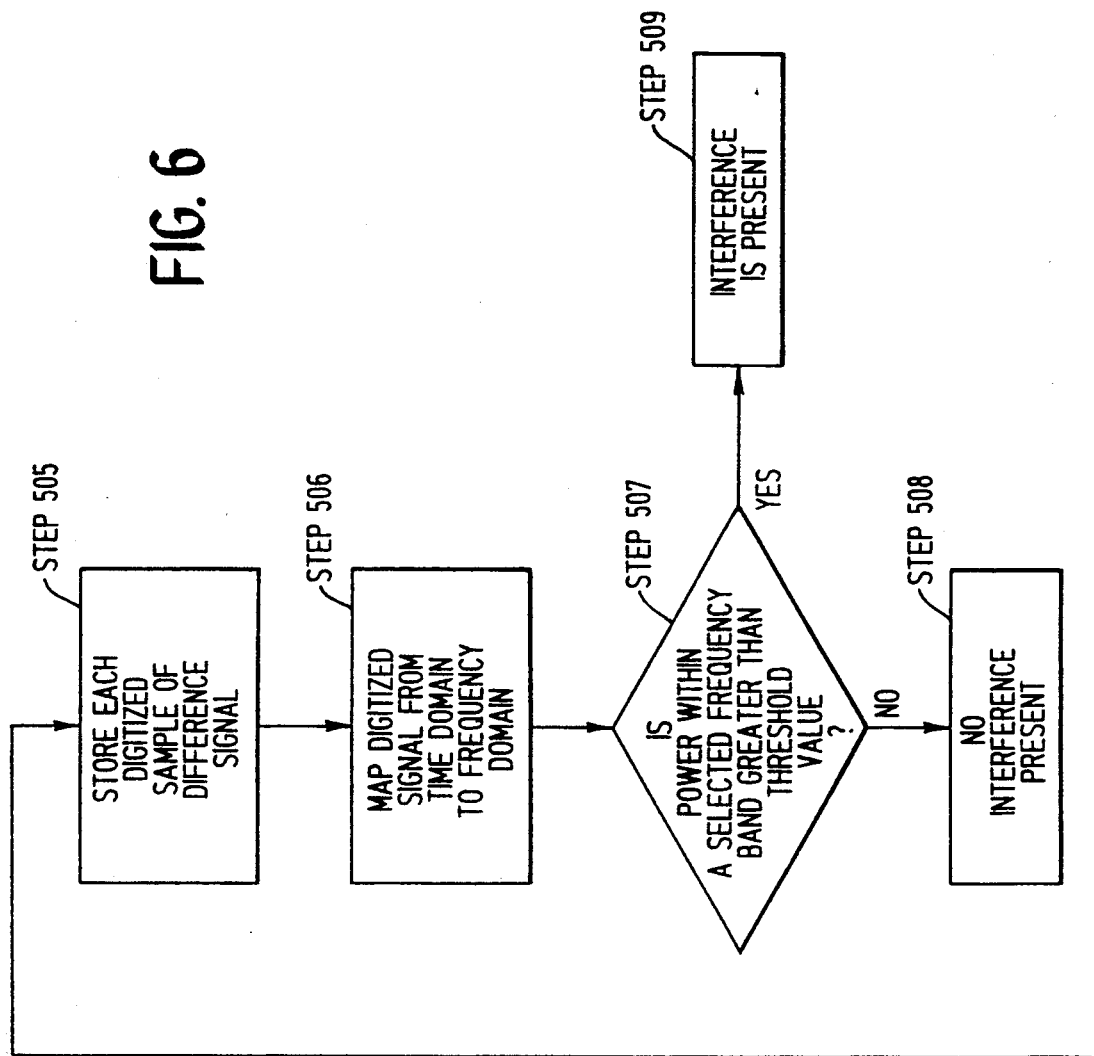
FIG. 6 is a flowchart of the steps taken to determine whether microwave interference is present.

FIG. 6 is a flowchart of the steps taken to determine whether microwave interference is present. An RF signal is transmitted (STEP 501) and the reflections thereof, together with signals generated by sources external to the present invention, are received (STEP 502). The received signals are compared with the transmitted signal and a difference signal having a frequency equal to the difference between the frequency of the received and transmitted signals is generated (503). The difference signal is digitized (STEP 504) and each of the resulting digital samples of the difference signal are stored in the RAM 208 (STEP 505). The samples are read from the RAM 208 by the DSP 204 which performs an FFT operation on the samples. The samples are thus mapped from the time domain into the frequency domain (STEP 506). The FFT operation results in a series of power levels corresponding to a series of frequencies. The power level of selected frequency bands are compared to a threshold which may be determined in a number of ways (STEP 507). If the power in the selected frequency band is greater than the threshold value, interference is assumed to be present (STEP 509). If the power in the selected frequency band is not greater than the threshold value, interference is assumed not to be present (STEP 508).

It should be understood that the present invention allows a vehicular target detection system to remain effective in a normally hostile environment in which interference would otherwise reduce the effectiveness of the target detection system. By detecting the presence of interference and commanding a change of frequency, the present invention provides a dynamic interference avoidance system that can respond to the changing interference patterns encountered when moving through differing environments, such as urban and suburban environments. Furthermore, the present invention provides fast recovery from contamination of the digital data stored due to interference, by reducing the number of bytes of digitized signal data required to determine the presence, range, and relative speed of a target.

A number of embodiments of the present invention have been described. Nevertheless, it will be understood that various modifications may be made without departing from the spirit and scope of the invention. For example, the noise floor threshold against which the microcontroller 206 compares the measured noise floor power level may be set in any number of ways, such as being programmed into the system by an operator, dynamically determined, fixed, or fixed with a programmable or dynamically determined offset. Furthermore, the microcontroller 206 can tune the oscillator 109 to any number of frequencies, and is not limited by the number of frequencies of the above disclosed embodiment. Still further, any digital to analog converter circuit may be used to control the voltage to the frequency control input 118 to the oscillator 109. It should also be understood that the present invention may be used with any form of surface transportation, such as automotive vehicles, trains, trolleys, and boats. Most importantly, it should be clear that the invention is independent of the particular target detection system into which the invention is incorporated and the invention, as herein described, could be incorporated into any target detection system in which a reflection of a transmitted signal is relied upon to detect the target and in which it can be determined that interference with the transmitted or reflected signal is present. Accordingly, it is to be understood that the invention is not to be limited by the specific illustrated embodiment, but only by the scope of the appended claims.

We claim:

1. An interference avoidance system for detecting and avoiding interference in a vehicular target detection system, including:
    a) a vehicular target detection system for generating at least a first and second transmit signal having different frequencies, and receiving signals including reflections of the transmit signals indicative of targets; and
    b) an interference detection system, coupled to the vehicular target detection system, for detecting whether interference is present in such received signals by determining the power level of a plurality of selected frequencies, averaging the power in each such selected frequency, and detecting that interference is present if the average power is greater than a reference value, and for causing the vehicular target detection system to change from at least the first transmit frequency to at least the second transmit frequency in response to such detection.

2. The interference avoidance system of claim 1, further including an oscillator modulation means, coupled to the microcontroller and the vehicular target detection system, for generating a control voltage controllable by the microcontroller.

3. The interference avoidance system of claim 2, wherein the oscillator modulation means is an analog circuit.

4. The interference avoidance system of claim 2, wherein the oscillator modulation means is a monolithic integrated digital to analog converter circuit.

5. The interference avoidance system of claim 1, wherein each transmit signal is a radio frequency signal, the target detection system is a radar system, and the interference detection system means includes:
    a) a difference detection means, coupled to the vehicular radar system, for generating a difference signal having a frequency equal to the difference between the frequency of one of the transmit signals and the received signal;
    b) a sampling means, coupled to the difference detection means, for sampling and digitizing the difference signal;
    c) a data storage means, coupled to the sampling means, for storing the digitized samples of the difference signal; and
    d) a mapping means, coupled to the data storage means, for mapping the digitized samples of the difference signal from the time domain to the frequency domain.

6. The interference avoidance system of claim 5, wherein each transmit signal is a two-frequency time-multiplexed signal alternating between a first frequency and a second frequency.

7. The interference avoidance system of claim 1, wherein the reference value is determined by adding an offset value to a fixed value.

8. The interference avoidance system of claim 7, wherein the fixed value is directly input from an operator.

9. The interference avoidance system of claim 7, wherein the offset value is determined as a function of the power level determined in the selected frequencies.

10. The interference avoidance system of claim 1, wherein the reference value is dynamically determined by averaging the power level in a noise floor across a band of frequencies sampled at specified intervals in frequency and time and adding a predetermined fixed level above the average level of the noise floor, averaged over the specified frequency and time.

11. The interference avoidance system of claim 1, wherein the reference value is selected by direct input from an operator.

12. The interference avoidance system of claim 1, wherein the power of the selected frequencies is determined by mapping the received signals from the time domain into the frequency domain.

13. The interference avoidance system of claim 12, wherein the received signals are mapped from the time domain into the frequency domain by a fast Fourier transform operation.

14. An interference avoidance system for detecting and avoiding interference in a vehicular target detection system including:
    a) transmit means for transmitting at least one signal;
    b) receive means for receiving at least one signal;
    c) comparison means, coupled to the transmit means and the receive means, for comparing the transmitted signal with the received signal and generating a difference signal based upon the comparison;
    d) sampling means, coupled to the comparison means, for sampling and digitizing the difference signal;
    e) data storage means, coupled to the sampling means, for storing the digitized samples of the difference signal;
    counter means, coupled to the sampling means, for determining whether at least 1,024 new samples have been stored in the data storage means;
    g) mapping means, coupled to the data storage means, for mapping the difference signal from the time domain into the frequency domain using the last 1,024 new samples stored in the data storage means;
    h) interference detection means, coupled to the mapping means, for determining from the frequency domain representation of the last 1,024 new samples stored in the data storage means whether the power present in at least one selected frequency band is greater than at least one threshold value;
    i) flushing means, coupled to the mapping means and the interference detection means, for flushing the samples stored in the data storage means upon detection of interference;
    j) frequency control means, coupled to the interference detection means and the transmit means, for changing the frequency of the signal being transmitted;

k) counter means, coupled to the sampling means, for determining whether at least 2,048 samples have been stored in the data storage means;

l) mapping means, coupled to the data storage means, for mapping the difference signal from the time domain into the frequency domain using the last 2,048 samples stored in the data storage means;

m) interference detection means, coupled to the mapping means, for determining from the frequency domain representation of the last 2,048 samples stored in the data storage means whether the power present in at least one selected frequency band is greater than at least one threshold value;

n) counter means, coupled to the sampling means, for determining whether at least 4,096 samples have been stored in the data storage means;

o) mapping means, coupled to the data storage means, for mapping the difference signal from the time domain into the frequency domain using the last 4,096 samples stored in the data storage means;

p) interference detection means, coupled to the mapping means, for determining from the frequency domain representation of the last 4,096 samples stored in the data storage means whether the power present in at least one selected frequency band is greater than at least one threshold value.

15. An method for detecting and avoiding interference in a vehicular target detection system including the steps of:

a) transmitting at least one signal;
b) receiving at least one signal;
c) comparing the transmitted signals with the received signals and generating a difference signal based upon the comparison;
d) sampling and digitizing the difference signal;
e) storing the digitized samples of the difference signal in a data storage device;
f) determining whether at least 1,024 new samples have been stored in the data storage device;
g) repeating steps a) through f) until at least 1,024 new samples have been stored in the data storage device;
h) mapping the difference signal from the time domain into the frequency domain using the last 1,024 new samples stored in the data storage device;
i) determining from the frequency domain representation of the last 1,024 new samples stored in the data storage device whether the power present in at least one selected frequency band is greater than at least one threshold value, and if so, then flushing the samples stored in the data storage device, changing the frequencies of the signals being transmitted, and returning to step a); otherwise
j) determining whether at least 2,048 samples have been stored in the data storage device;
k) repeating steps a) through k) until 2,048 samples have been stored in the data storage device;
l) mapping the difference signal from the time domain into the frequency domain using the last 2,048 samples stored in the data storage device;
m) determining from the frequency domain representation of the last 2,048 samples stored in the data storage device whether the power present in at least one selected frequency band is greater than at least one threshold value, and if so, then flushing the samples stored in the data storage device, changing the frequencies of the signals being transmitted, and returning to step a); otherwise
n) determining whether at least 4,096 samples have been stored in the data storage device;
o) repeating steps a) through e), followed by steps l) through o) until 4,096 samples have been stored in the data storage device;
p) mapping the difference signal from the time domain into the frequency domain using the last 4,096 samples stored in the data storage device;
q) determining from the frequency domain representation of the last 4,096 samples stored in the data storage device whether the power present in at least one selected frequency band is greater than at least one threshold value, and if so, then flushing the samples stored in the data storage device, changing the frequencies of the signals being transmitted, and returning to step a); otherwise
r) repeating steps a) through e), followed by steps p) through r).

16. An interference avoidance system for detecting and avoiding interference in a vehicular target detection system including:

a) a transmitter for transmitting at least one signal;
b) a receiver for receiving at least one signal;
c) a comparator, coupled to the transmitter and the receiver, for comparing the transmitted signal with the received signal and generating a difference signal based upon the comparison;
d) a sampling circuit, coupled to the comparator, for sampling and digitizing the difference signal;
e) a data storage device, coupled to the sampling circuit, for storing the digitized samples of the difference signal;
f) a counter, coupled to the sampling circuit, for determining the number of samples stored in the data storage device and representing that number as a count value;
g) a mapping circuit, coupled to the data storage device, for mapping the difference signal from the time domain into the frequency domain using a selected number of the most recent new samples stored in the data storage device;
h) an interference detection system, coupled to the mapping circuit, for determining from the frequency domain representation of the selected most recently sampled new samples stored in the data storage means whether the power present in at least one selected frequency band is greater than at least one threshold value;
i) a flusher, coupled to the mapping circuit and the interference detection system, for flushing the samples stored in the data storage means upon detection of interference and for resetting the counter;
j) a frequency controller, coupled to the interference detection system and the transmitter, for changing the frequency of the signal being transmitted.

17. The interference avoidance system of claim 16, wherein the selected number of most recent new samples used by the mapping circuit increases as the count value of the counter increases.

18. A method for detecting and avoiding interference of a vehicular target detection system, including the following steps:

a) generating at least a first and second transmit signal having different frequencies, and receiving signals including reflections of the transmit signals indicative of targets;
b) detecting interference is present in such received signals by determining the power level of a plurality of selected frequencies, averaging the power in each such selected frequency, and detecting that the average power is greater than a reference value.

c) causing the vehicular target detection system to change from at least the first transmit frequency to at least the second transmit frequency in response to such detection.

* * * * *